United States Patent Office 3,427,683
Patented Feb. 18, 1969

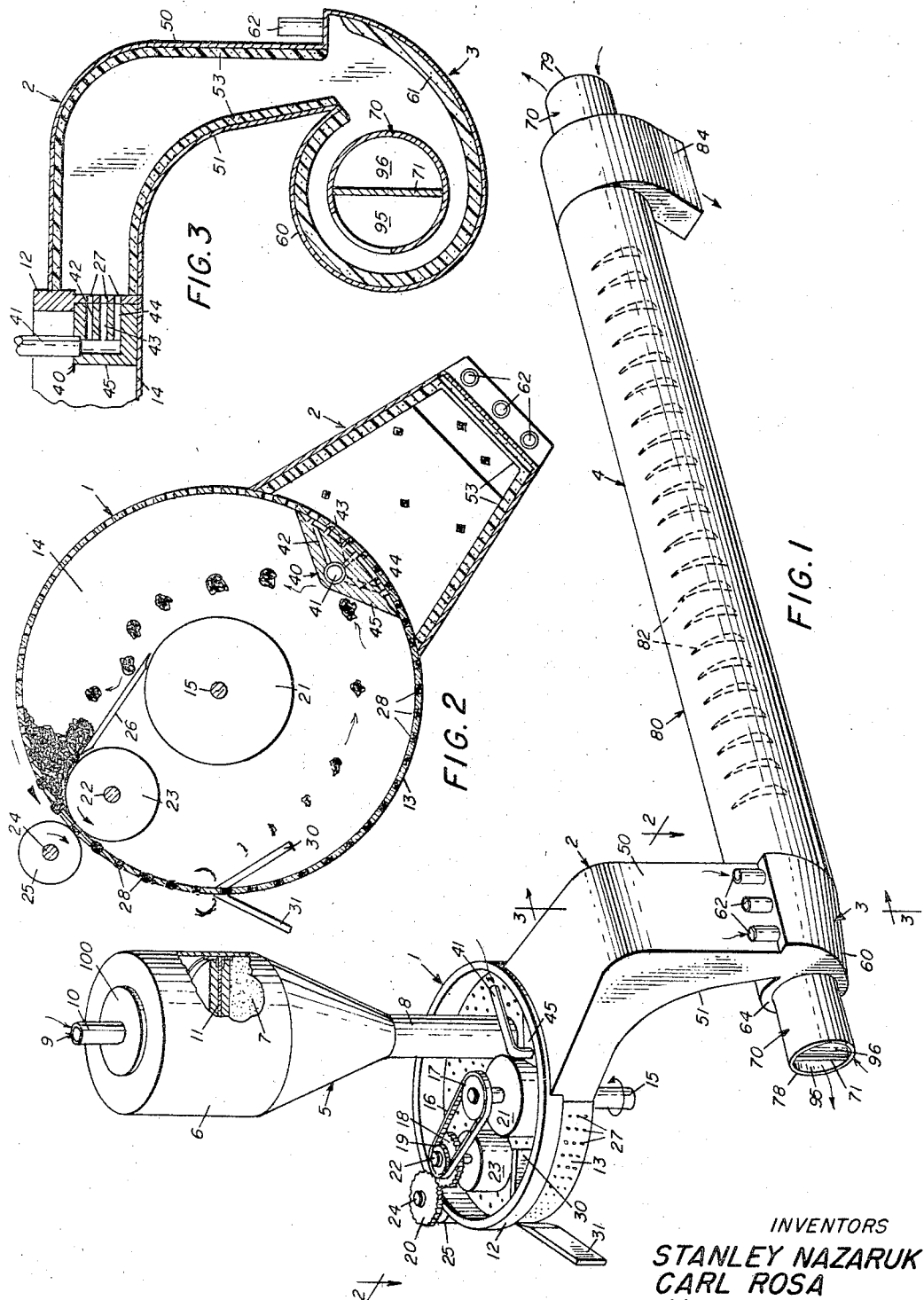

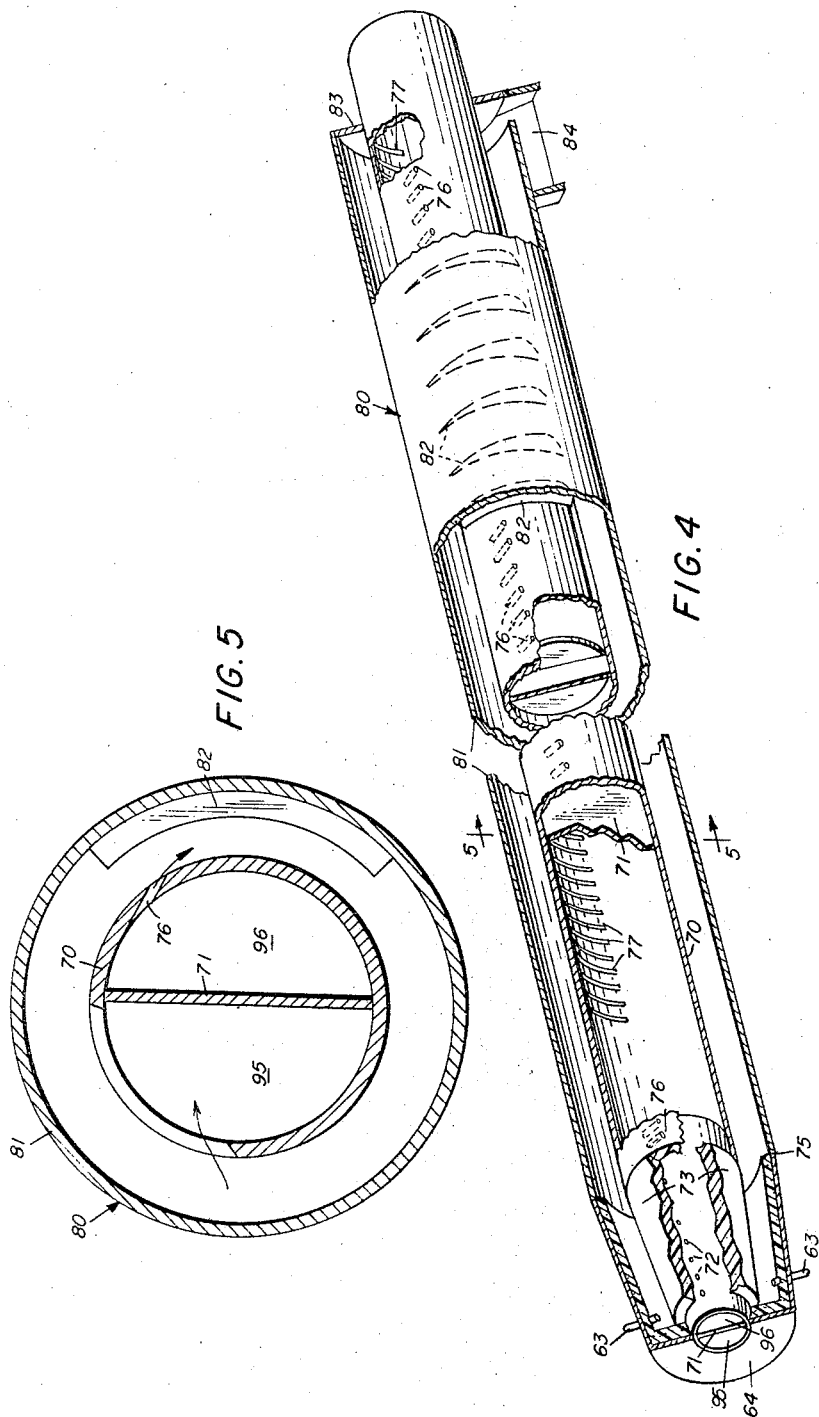

3,427,683
APPARATUS FOR FORMING SPHERICAL PELLETS
Stanley Nazaruk, Clairton, and Carl Rosa and Alvin F. Headrick, Bethel Park, Pa., assignors to the United States of America as represented by the Secretary of the Interior
Filed Jan. 18, 1967, Ser. No. 610,726
U.S. Cl. 18—1                                  4 Claims
Int. Cl. B29c 24/00; B28b 1/20

ABSTRACT OF THE DISCLOSURE

The present invention relates to a device for preparing dense uniformly sized spherical pellets of good structural integrity from pastes. In this device, paste is compressed from both sides into presized holes in a die plate. The resulting cylindrical pellets are ejected from the die by air pressure and then passed through a cyclone unit into a cylindrical balling chamber fitted with turning tabs wherein the pellets are shaped into uniform spheres, by contact with the wall portion of the balling chamber and the tabs, as they are passed in a helical path through the chamber with the aid of a fluid medium.

Background of invention

Compact spherical pellets of organic and inorganic materials have a variety of uses. Such utilities include aggregate filling materials, adsorbents, and catalysts. Often such pelleted materials are subjected to long use wherein they are fluidized, suspended, transported in a gas stream or otherwise exposed to conditions which promote comminution. It has long been recognized that under these circumstances a spherical shaped pellet is most desirable as it does not present any rough edges or corners which may easily be broken away or chipped. Still further it has been found that uniformity in size is desirable, particularly where physical parameters such as size, weight, or surface area are important as, for example, when the pellet is to be used as a catalyst or adsorbent in a fluidized bed.

Previously, numerous methods have been used to form uniformly dense spherical particles. One often practiced method involves suspending drops of aqueous gel-forming liquid in a water immiscible liquid, allowing the drops to set forming beads and drying and calcining the resulting beads.

Problems presented when using this method are lack of uniformity and control of the particle size.

Recognizing the difficulties in the above-mentioned methods, processes have been developed wherein the material to be pelleted is first made into a paste, extruded, and then comminuted in a cyclone. Some materials, notably inorganic oxides, are further dried and calcined.

Illustrative of this method of forming spherical pellets in U.S. Patent 3,154,603 to Witheford et al. In that process a deformable paste, which may include a plasticizer, is fed to an extruder where it is forced through holes in a die plate. The expressed extrudate is sliced off with knives or a fluid medium. These masses are then fed to a conventional cyclone for shaping.

This system of Witheford et al., presents an improvement over prior bead forming techniques. Still, the method and apparatus used does not always achieve the desired spherical shape or uniformity in size. The reasons for this are twofold. First, in the extruding operation it often happens that extrudates of varying densities and shapes are formed as there is no means available to assure a uniform length of the expressed extrudate. Secondly, comminutation in conventional cyclones or tapered cylinders by the centrifugal action of a fluid medium often gives rise to a phenomena termed "barrel rolling" which occurs when the pellet continually presents the same face toward the outer surface of the cyclone and instead of achieving a spherical shape, the pellet emerges with a barrel or cylindrical shape.

Objects of invention

Accordingly, it is an object of this invention to provide an improved apparatus for forming spherical pellets.

Further, it is an object of this invention to provide an improved apparatus for forming spherical pellets of a uniform predetermined size.

Further still, it is an object of this invention to provide an improved apparatus to form dense uniformly sized spherical pellets from a paste mixture.

Still further, objects and features of the invention will become apparent from the following description and accompanying drawings.

Description of invention

Briefly, the apparatus of the present invention comprises: a particle-forming zone wherein paste is compressed from both sides into holes of a pre-determined size in a die plate to form cylindrical particles and wherein said formed particles are ejected from the die holes; a particle transfer zone wherein the ejected particles are carried away from the die; a cyclone zone wherein the particles are forced into a helical path; and a generally horizontal, elongated, cylindrical, shaping zone wherein the particles are shaped with the aid of a fluid medium into spheres.

The apparatus and its several parts will be more fully undestood by the following detailed description wherein reference is made to the figures of the accompanying drawings in which:

FIG. 1 is a schematic view of the entire apparatus;

FIG. 2 is a sectional view of the particle forming zone, taken on line 2—2 of FIG. 1;

FIG. 3 is a view in cross section of the transfer and cyclone zones, taken on line 3—3 of FIG. 1;

FIG. 4 is an elevational view partly in cross section showing the cyclone and shaping zones, and FIG. 5 is a cross sectional view of the shaping zone, taken on line 5—5 of FIG. 4.

Referring now to FIG. 1, the spherical pellet-forming apparatus is seen as comprising particle forming zone 1, transfer zone 2, cyclone zone 3, and shaping zone 4. Optionally, there may also be incorporated a paste feeding mechanism shown as 5 in FIG. 1.

Paste 7 to be pelleted is stored in hopper 6 which is fitted with a paste feeding orifice 100 and delivery spout 8. Paste 7 may be forced through delivery spout by a number of conventional means. The particular one shown in FIG. 1 includes a pneumatically driven system in which air 9 entering pipe 10 exerts a downward pressure on a ram 11 slideably mounted within hopper 6 causing paste 7 to assume the desired flow through delivery chute 8. From chute 8, the paste enters particle forming zone 1, which comprises a rotatably mountable cylindrical vessel whose side walls 12 contain a perforated die portion 13. The paste exiting from chute 8 is collected on the base portion 14 of 1, as shown in FIG. 2.

A powered drive shaft 15 turns the die assembly. Shaft 15 has affixed to it roll 21 and also gear 17. Gear 17 forms the initial drive gear of a gear train which also includes chain or belt 16, gear 18, drive 19 and gear 20. Superimposed gear 18 and drive 19 are attached to shaft 22 which rotates inner roll 23 and gear 20 is affixed to shaft 24 which turns outer roll 25.

As shown in FIG. 2, roll 21 with the aid of blade 26 serves to guide paste 7 lying on rotating base portion 14 to inner roll 23 which forces paste 7 into holes 27 of die portion 13 in side wall 12 of the rotating assembly. At the same time, outer roll 25 compresses the paste within holes 27 from the opposite side of die portion 13 thereby formity in the size of cylindrical particles 28. The particles 28. These particles are carried by holes 27 past inner and outer blades 30 and 31, respectively, trimming off any excess material which may overlap the inside and outside surfaces of die portion 13, thus creating exceptional uniforming in the size of cylindrical particles 28. The particles continue rotation in die portion 13 until they set opposite the inlet of the transfer zone 2. At that point they are propelled into transfer section 2 by an air ejection assembly 40 which comprises air inlet pipe 41, air tubes 42, 43 and 44, and shroud 45. As particles 28 carried in holes 27 pass air injection system, they come directly adjacent air ejection tubes 42, 43 and 44, the airstream from those tubes being of sufficient strength to blow particles 28 from holes 27 and into transfer zone 2. It is preferable that such tubes be staggered as they are in FIGS. 2 and 3 so that one particle is ejected at a time.

FIG. 3 shows the path of the ejected pellets 28 as they bounce back and forth between the inner and outer walls 50 and 51, respectively, of the transfer zone. With fragile, easily powdered or extremely sticky materials it may be desirable to line walls 50 and 51 with plastic foam 53, or other resilient material. While it is not necessary that the transfer zone have the size and shape shown in FIGS. 1 and 3, it is desirable that the pellets travel in a path similar to that depicted. The ricocheting action tends to remove surface gloss from the pellets and thus render them less sticky.

Leaving transfer zone 2 the pellets are fed continuously to a cyclone zone 3. Cyclone 3 as shown in FIGS. 1, 3 and 4 includes cylindrical housing 60, which like walls 50 and 51 of the transfer zone, may be lined with plastic foam or other resilient material 61, air jets 62, air jets 63, and transverse wall portion 64. Positioned within cyclone unit 3 and axially concentric therewith is driving tube 70.

As shown in FIG. 4, the cyclone is conically shaped. The driving tube is sealed with and extends through wall portion 64. (See FIG. 1.) Within the driving tube is a divider 71 which segregates driving tube 70 into an air feeding zone 95 and an air exhaust zone 96 as shown in FIGS. 3, 4 and 5. Also within driving tubes 70 are air jets 72 which extend tangentially from tube 70 through optional padding 73 which again may be formed from a resilient material such as plastic foam.

Pellets entering cyclone unit 3 are subjected to a circumferential force generated by the action of air jets 62 and air jets 72 causing the pellets to travel around driving tube 70. Air jets 63 enter cyclone 3 radially as shown in FIG. 4 or through wall 64 in a direction perpendicular to the flow created by jets 62. The purpose of jets 63 is to prevent the accumulation of pellets or balling within the cyclone and to aid in giving the pellets a direction of velocity which carries them along driving tube 70 and away from the cyclone unit. Attached at 75 to cyclone unit 3 is balling tube 80 which comprises cylindrical housing 81, baffles or turning tabs 82, end plate 83, and spout 84. The walls of the balling tube 80 are parallel to those of driving tube 70. The portion of driving tube 70 which is within balling tube 80 is of constant diameter. Tangential air jets 76 similar to jets 72 in the cyclone portion, serve to create a circumferential flow of air around the driving tube. Also positioned in tube 70 are exhaust slots 77 which are separated from jets 76 by divider 71. These slits are positioned at a distance away from the cyclone unit and serve to exhaust air but not pellets from the area between the driving and balling tubes thereby drawing the flow of pellets down balling tube 80 and away from cyclone 3. Thus, the pellets develop a helical flow as they enter the balling tube from the cyclone. As shown in FIG. 4, the driving tube may be divided into two or more sections by the use of a baffle 90, each section having its own air jets 76 and exhaust slits 77. The jets 76 being placed along the whole surface while the slits 77 are located primarily on the downstream end of individual sections of the driving tube.

In the operation of the shaping zone 4, air is supplied to the air feeding side 95 of driving tube 70 and is withdrawn from the exhaust side 96 thus causing the pellets emerging from cyclone zone 3 to travel in a generally horizontal helical path down balling tube 80 toward the exit spout. During this residence, the pellets come in contact with the wall 81 of balling tube 80 and also with the turning tabs 82. These tabs serve an important function in the shaping zone. Without them, the pellets have a tendency to continually present the same surface to wall 81 of the balling tube exhibiting the phenomena known as "barrel rolling." If such a phenomena is not prevented, the pellets will not acquire a truly spherical shape, but rather will take on a cylindrical or barrel shape. The tabs cause the pellets to mix and turn and prevent "barrel rolling" from occurring.

Control of the air supply to the various jets regulates the residence time within the shaping zone. In addition, the length and circumference of the balling tube may be designed in accordance with the desired pellet size and the physical nature of the material being treated.

A large number of materials may be used in the present apparatus. Inorganic salts, oxides, clays, ores, and gels as well as organic material such as alfalfa may be pelleted with the present device. Many materials which required lubricants or plasticizers when pelleted in conventional extruders will require much less or none of those agents in the present apparatus due to the compressive forces exerted by the rolls in the particle-forming zone. However, lubricants and plasticizers as well as extenders, fillers and surface active agents may be employed in the paste mixture to assure the proper consistency for the formation of uniformly spherical pellets.

As can be seen by the above description, the apparatus of the present invention provides for a unique mode of producing dense, uniformly shaped spherical pellets. Furthermore, the device is easily modified to accommodate different types of paste having varying physical characteristics to produce uniformly shaped spherical pellets of a predetermined size. For example, cylinder 12 containing die portion 13 can be made removable so that dies of different sizes can be used. In this respect, it has been found that spheres as small as 1/16" in diameter are easily formed. Also, means can be provided to collect the scrapings from outer blade 31 and to recycle them to the particle-forming zone.

Still other modifications and adaptations will become obvious to those of ordinary skill in the art. Thus, while there is illustrated and described herein certain preferred embodiments of the invention, it should be understood that various changes may be made without departing from the spirit and scope of the invention concepts which are particularly pointed out and claimed herebelow.

What is claimed is:
1. An apparatus for making spherical pellets from paste comprising:
 (A) a die assembly comprising a die plate having a plurality of die holes;
 (B) means to compress paste into said holes from a first side of said die plate;
 (C) means to simultaneously apply a compressive force against said holes from the opposite side of said die plate thereby compressing the paste into pellets;
 (D) means to eject said pellets from said holes;
 (E) cyclone means to accelerate said ejected pellets into a helical path;
 (F) shaping means communicating with and adapted to accept pellets from said cyclone means comprising:
  (1) a generally horizontally disposed balling cylinder;
  (2) a plurality of baffles within said cylinder, said baffles having surfaces substantially normal to the interior surface of said cylinder;

(3) means to continue said pellets on a helical path through said chamber.

2. The apparatus of claim 1 wherein said die plate is a cylindrical die which is rotary driven and wherein said ejection means comprises a fluid stream.

3. The apparatus of claim 2 wherein there is included a means to feed paste to said die assembly.

4. The apparatus of claim 1 wherein said means to continue said pellets comprises a driving tube cylinder concentrically positioned within said balling cylinder, said driving tube cylinder being longitudinally divided into a high pressure zone and a low pressure zone, said high pressure zone having associated therewith air jet providing fluid communication through the wall portion of said zone and being generally tangentially disposed to said driving tube cylinder, and said low pressure zone having associated therewith means to provide fluid communication between the exterior of said driving tube cylinder and said low pressure zone.

References Cited

UNITED STATES PATENTS

| | | |
|---|---|---|
| 1,106,138 | 8/1914 | Du Pont. |
| 2,641,044 | 6/1953 | Bearer. |
| 2,813,299 | 11/1957 | Massey _____ 18—1 |
| 3,039,165 | 6/1962 | Old _____ 18—1 |
| 3,213,170 | 10/1965 | Erdmenger et al. _____ 18—12 |
| 3,355,765 | 12/1967 | Hendry _____ 18—12 |

WILLIAM J. STEPHENSON, *Primary Examiner.*

U.S. Cl. X.R.

18—12